US011794402B2

(12) United States Patent
Al-Hashmy et al.

(10) Patent No.: US 11,794,402 B2
(45) Date of Patent: Oct. 24, 2023

(54) REDUCING MANUFACTURING DEFECTS OF A WOUND FILAMENT PRODUCT

(71) Applicant: Saudi Arabian Oil Company, Dhahran (SA)

(72) Inventors: Hassan Ali Al-Hashmy, Dhahran (SA); Kaamil Ur Rahman Mohamed, Dhahran (SA); Abderrahim Fakiri, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 708 days.

(21) Appl. No.: 16/719,512

(22) Filed: Dec. 18, 2019

(65) Prior Publication Data

US 2021/0187817 A1 Jun. 24, 2021

(51) Int. Cl.
*B29C 53/56* (2006.01)
*B29C 53/80* (2006.01)
(Continued)

(52) U.S. Cl.
CPC .......... *B29C 53/8083* (2013.01); *B29C 53/56* (2013.01); *B29C 53/821* (2013.01); *B29L 2023/22* (2013.01); *B29L 2031/712* (2013.01)

(58) Field of Classification Search
CPC ............... B29C 53/821; B29C 53/56
See application file for complete search history.

(56) References Cited

U.S. PATENT DOCUMENTS 3,594,247 A   7/1971 Pennington et al.
4,529,139 A   7/1985 Smith et al.
(Continued)

FOREIGN PATENT DOCUMENTS

CN   106273533   6/2018
DE   19704988    9/1998
(Continued)

OTHER PUBLICATIONS

Colombo et al, "Optimization of filament winding parameters for the design of a composite pipe," Composites Part B: Engineering, vol. 148, Sep. 2018, pp. 207-216, 28 pages.
(Continued)

*Primary Examiner* — Alison L Hindenlang
*Assistant Examiner* — Debjani Roy
(74) *Attorney, Agent, or Firm* — Fish & Richardson P.C.

(57) ABSTRACT

A filament winding assembly includes a rotating mandrel coupled to a shaft that rotates the rotating mandrel. The rotating mandrel includes a first perforated sleeve that defines holes and includes a winding surface. The rotating mandrel also includes a second perforated sleeve disposed inside the first perforated sleeve. The second perforated sleeve defines an interior volume and holes configured to form fluid pathways with the holes of the first perforated sleeve. The fluid pathways extend from the interior volume to the winding surface of the first perforated sleeve. The filament winding assembly includes a filament that is wound, under tension, around the winding surface of the first perforated sleeve. The filament winding assembly also includes a fluid source fluidically coupled to the interior volume of the second perforated sleeve. The fluid source exhausts fluid, through the fluid pathways, from the wound filament to reduce manufacturing defects of the wound filament.

16 Claims, 5 Drawing Sheets

(51) Int. Cl.
*B29C 53/82* (2006.01)
*B29L 23/00* (2006.01)
*B29L 31/00* (2006.01)

(56) References Cited

U.S. PATENT DOCUMENTS

| | | | |
|---|---|---|---|
| 4,588,538 A | 5/1986 | Chung et al. | |
| 4,749,534 A | 6/1988 | Robretson | |
| 4,822,444 A | 4/1989 | Weingart et al. | |
| 4,838,971 A | 6/1989 | Cacak | |
| 4,997,503 A | 3/1991 | Bohannan et al. | |
| 5,128,198 A | 7/1992 | Dyksterhouse | |
| 5,171,630 A | 12/1992 | Muzzy et al. | |
| 5,540,797 A | 7/1996 | Wilson | |
| 5,936,861 A | 8/1999 | Jang et al. | |
| 6,179,945 B1 | 1/2001 | Greenwood et al. | |
| 6,495,091 B1 | 12/2002 | Manson | |
| 6,558,146 B1 | 5/2003 | Shah et al. | |
| 7,815,141 B2 | 10/2010 | Uozumi et al. | |
| 7,905,442 B2 | 3/2011 | Uozumi et al. | |
| 9,757,905 B2 | 9/2017 | Harasin et al. | |
| 2002/0148553 A1* | 10/2002 | Campbell, Jr. | B29C 70/549 156/227 |
| 2014/0050862 A1 | 2/2014 | Borger | |
| 2014/0061974 A1 | 3/2014 | Tyler | |
| 2014/0328963 A1 | 11/2014 | Mark et al. | |
| 2015/0360423 A1 | 12/2015 | Torres et al. | |
| 2016/0144566 A1 | 5/2016 | Mark et al. | |
| 2017/0028639 A1 | 2/2017 | Evans et al. | |
| 2018/0065300 A1 | 3/2018 | Tyler | |
| 2018/0065318 A1 | 3/2018 | Tyler | |
| 2018/0207850 A1 | 7/2018 | Stockett et al. | |
| 2018/0207866 A1 | 7/2018 | Tyler | |
| 2018/0229429 A1 | 8/2018 | Tyler et al. | |
| 2018/0370129 A1 | 12/2018 | Natale et al. | |
| 2019/0001566 A1 | 1/2019 | Tyler et al. | |
| 2019/0009472 A1 | 1/2019 | Mark | |
| 2020/0086563 A1 | 3/2020 | Budge | |
| 2020/0376781 A1 | 12/2020 | Wadsworth | |
| 2021/0101330 A1 | 4/2021 | Hikmet | |
| 2021/0178659 A1 | 6/2021 | Fakiri et al. | |
| 2021/0178669 A1 | 6/2021 | Fakiri et al. | |

FOREIGN PATENT DOCUMENTS

| | | | |
|---|---|---|---|
| DE | 102004013446 | 10/2005 | |
| DE | 102014100711 | 7/2015 | |
| DE | 102014100711 A1 * | 7/2015 | B29C 53/566 |
| DE | 102016202053 | 8/2017 | |
| EP | 2324994 | 5/2011 | |
| EP | 3219474 | 9/2017 | |
| JP | S5547351 | 3/1980 | |
| WO | WO 2015024363 | 2/2015 | |
| WO | WO 2016107808 | 7/2016 | |
| WO | WO 2017100991 | 6/2017 | |
| WO | WO 2017137233 | 8/2017 | |
| WO | WO 2018189062 | 10/2018 | |

OTHER PUBLICATIONS

Gonzalez-Henriquez et al, "3.21 Filament Winding Applications," Comprehensive Composite Materials II, vol. 3, 2018, pp. 556-577, 22 pages.

Koustas et al, "On the development of a filament winding robotic system," Procedia Manufacturing, vol. 17, 2018, pp. 919-926, 8 pages.

Minsch et al, "Analysis of Filament Winding Processes and Potential Equipment Technologies," Procedia CIRP vol. 66, 2017, pp. 125-130, 6 pages.

Munro, "Review of manufacturing of fiber composite components by filament winding" Polymer Composites, vol. 9, issue 5, pp. 352-359, Oct. 1988, 8 pages.

PCT International Search Report and Written Opinion issued in International Application No. PCT/US2020/0655550 dated Mar. 12, 2021, 13 pages.

PCT International Search Report and Written Opinion in International Appln. No. PCT/US2020/065531, dated Mar. 29, 2021, 14 pages.

PCT International Search Report and Written Opinion in International Appln. No. PCT/US2020/065545, dated Mar. 29, 2021, 15 pages.

Frketic et al, "Automated manufacturing and processing of fiber-reinforced polymer (FRP) composites: An additive review of contemporary and modern techniques for advanced materials manufacturing," Additive Manufacturing, 14, pp. 69-86, Jan. 2017, 61 pages.

Manz [online], "Fully Automated in a Single Process: Optimization & Manufacturing of CFRP Components," Altair, retrieved on Oct. 17, 2019, from URL: <https://www.altair.com/ResLibDownload.aspx?file_id2=3669>, 4 pages.

Yang et al, "3D printing for continuous fiber reinforced thermoplastic composites: Mechanism and performance," Rapid Prototyping Journal, vol. 23, No. 1, pp. 209-215, Jan. 2017, 7 pages.

SAIP Examination Report in SAIP Appln. No. 522433061, dated Jun. 17, 2023, 8 pages, with English Summary.

* cited by examiner

REDUCING MANUFACTURING DEFECTS OF A WOUND FILAMENT PRODUCT

FIELD OF THE DISCLOSURE

This disclosure relates to continuous fabrication methods, in particular, to filament winding.

BACKGROUND OF THE DISCLOSURE

Filament winding is a manufacturing process used to produce composite parts such as pipes or pressure vessels. The process includes dipping continuous fibers (for example, fiber filaments) in a matrix material and winding the fibers onto a mandrel. The fibers are wound until the surface of the mandrel is covered and the required thickness is achieved to form the final product. Manufacturing defects such as voids and uneven curing can affect the structural integrity and mechanical properties of the final product.

SUMMARY

Implementations of the present disclosure include a filament winding assembly that includes a rotating mandrel coupled to a shaft configured to rotate the rotating mandrel. The rotating mandrel includes a first perforated sleeve that defines holes and includes a winding surface. The rotating mandrel also includes a second perforated sleeve disposed inside the first perforated sleeve. The second perforated sleeve is attached to the shaft and defines an interior volume. The second perforated sleeve defines holes configured to form fluid pathways with the holes of the first perforated sleeve. The fluid pathways extend from the interior volume to the winding surface of the first perforated sleeve. The filament winding assembly also includes a filament configured to wound, under tension, around the winding surface of the first perforated sleeve. The filament winding assembly also includes a fluid source fluidically coupled to the interior volume of the second perforated sleeve. The fluid source is configured to exhaust fluid, through the fluid pathways, from the wound filament to reduce manufacturing defects of the wound filament.

In some implementations, the second perforated sleeve is configured to rotate with respect to the first perforated sleeve to align or misalign the holes of the second perforated sleeve with the holes of the first perforated sleeve to open or close the fluid pathways. The interior volume is open when the holes of the second perforated sleeve are aligned with the holes of the first perforated sleeve. The interior volume is at least partially closed when the holes of the second perforated sleeve are misaligned with respect to the holes of the first perforated sleeve. In some implementations, the fluid source is configured to vacuum, with the interior volume open, air from the wound filament to reduce voids in the wound filament. In some implementations, the fluid source or a different fluid source fluidically coupled to the interior volume is configured to flow, with the interior volume at least partially closed, steam into the interior volume to heat the rotating mandrel to help uniformly cure at least part of the wound filament. In some implementations, each hole of the second perforated sleeve is configured to align with each hole of the first perforated sleeve to form respective fluid pathways. In some implementations, the second perforated sleeve is tightly snug inside the first perforated sleeve to help prevent fluid from flowing between an outer surface of the second perforated sleeve and an inner surface of the first perforated sleeve. In some implementations, the mandrel includes a lock attached to the first perforated sleeve and the second perorated sleeve. The lock is actuable to prevent rotation of the second perforated sleeved with respect to the first perforated sleeve and actuable to allow rotation of the second perforated sleeved with respect to the first perforated sleeve.

In some implementations, the second perforated sleeve includes a first closed end opposite a second closed end. At least one of the first closed end or the second closed end is attached to the shaft to rotate the rotating mandrel.

In some implementations, the first perforated sleeve is a first perforated tube and the second perforated sleeve is a second perforated tube. The second perforated tube is axially coupled to the shaft. The second perforated tube and the first perforated tube are configured to rotate together with the shaft during winding of the filament.

In some implementations, the fluid source is configured to vacuum, with the interior volume open, air from the wound filament during a manufacturing process when the filament is being wound on the mandrel.

In some implementations, the shaft is a hollow shaft including apertures. The hollow shaft defines a second interior volume fluidically coupled, through the shaft apertures, to the interior volume of the second perforated sleeve. The fluid source is fluidically coupled, through a fluid conduit extending through the second interior volume of the hollow shaft, to the interior volume of the second perforated sleeve.

Implementations of the present disclosure include a method that includes winding, under tension and by a filament winding assembly, an impregnated filament on a winding surface of a rotating mandrel. The rotating mandrel includes 1) a first perforated sleeve defining holes and including the winding surface, and 2) a second perforated sleeve disposed inside the first perforated sleeve. The second perforated sleeve defines an interior volume and defining holes configured to form fluid pathways with the holes of the first perforated sleeve. The method also includes exhausting, by a fluid source of the filament winding assembly that is fluidically coupled to the interior volume, air through the fluid pathways from the winding surface of the first perforated sleeve to reduce manufacturing defects of the wound filament.

In some implementations, the second perforated sleeve is rotatable with respect to the first perforated sleeve to align or misalign the holes of the second perforated sleeve with the holes of the first perforated sleeve to open or close the fluid pathways. The interior volume is open when the holes of the second perforated sleeve are aligned with the holes of the first perforated sleeve and the interior volume is at least partially closed when the holes of the second perforated sleeve are misaligned with respect to the holes of the second perforated sleeve. In such implementations, the method also includes, with the interior volume closed, flowing fluid, by the fluid source or a different fluid source fluidically coupled to the interior volume, steam into the interior volume to heat the rotating mandrel to help uniformly cure at least part of the wound filament. In some implementations, rotating the second perforated sleeve with respect to first perforated sleeve includes rotationally unlocking the first perforated sleeve from the second perforated sleeve, rotationally locking the first perforated sleeve, and rotating the second perforated sleeve with respect to the first perforated sleeve.

In some implementations, exhausting the air through the fluid pathways includes vacuuming air from the wound filament to reduce voids in the wound filament.

Implementations of the present disclosure also feature a filament winding mandrel that includes a first perforated sleeve defining holes and including a winding surface. The mandrel also includes a second perforated sleeve disposed inside the first perforated sleeve. The second perforated sleeve is attached to a rotating shaft configured to rotate the filament winding mandrel. The second perforated sleeve defines an interior volume and defines holes configured to form fluid pathways with the holes of the first perforated sleeve. The fluid pathways extend from the interior volume to the winding surface of the first perforated sleeve. The second perforated sleeve is configured to be fluidically coupled to a fluid source configured to exhaust fluid, through the fluid pathways, from the winding surface of the first perforated sleeve to reduce manufacturing defects of a filament wound on the winding surface of the first perforated sleeve.

In some implementations, the second perforated sleeve is configured to rotate with respect to the first perforated sleeve to align or misalign the holes of the second perforated sleeve with the holes of the first perforated sleeve to open or close the fluid pathways. The interior volume is open when the holes of the second perforated sleeve are aligned with the holes of the first perforated sleeve and the interior volume is at least partially closed when the holes of the second perforated sleeve are misaligned with respect to the holes of the second perforated sleeve. In some implementations, each hole of the second perforated sleeve is configured to align with each hole of the first perforated sleeve to form respective fluid pathways. In some implementations, the second perforated sleeve is tightly snug inside the first perforated sleeve to help prevent fluid from flowing between an outer surface of the second perforated sleeve and an inner surface of the first perforated sleeve. In some implementations, the first perforated sleeve is a first perforated tube and the second perforated sleeve is a second perforated tube. The second perforated tube is axially coupled to the shaft. The second perforated tube and the first perforated tube are configured to rotate together with the shaft during winding of the filament.

DETAILED DESCRIPTION OF THE DISCLOSURE

The present disclosure describes filament winding methods and equipment that reduce manufacturing defects of composite products. A mandrel that is made of two concentric perforated tubes can close and open the interior volume of the mandrel. The perforated tubes have corresponding holes that form fluid pathways that extend from the interior volume. The perforated tubes can rotate with respect to each other to align or misalign their respective holes, opening and closing the fluid pathways. With the interior volume open, air can be vacuumed from the wound filament to reduce or eliminate voids and other manufacturing defects. With the interior volume closed, steam can be injected into the mandrel to partially and uniformly cure the wound filament.

Particular implementations of the subject matter described in this specification can be implemented so as to realize one or more of the following advantages. For example, vacuuming air out of the wound product can reduce voids and other manufacturing defects, improving the structural integrity of the final product. Injecting steam into the mandrel partially cures the composite product, allowing the product to be removed from the mandrel for additional processing. In addition, the mandrel of the present disclosure allows in-situ vacuuming and partially curing of the wound product, without moving the mandrel or the wound product to a different station. Additionally, the mandrel of the present disclosure can be used in helical winding machines and polar winding machines. The filament winding assembly or system of the present disclosure allows removing the trapped air from the wound product followed by steam injection, combining the advantages of both processes to allow easy composite part removal.

Figure 1:
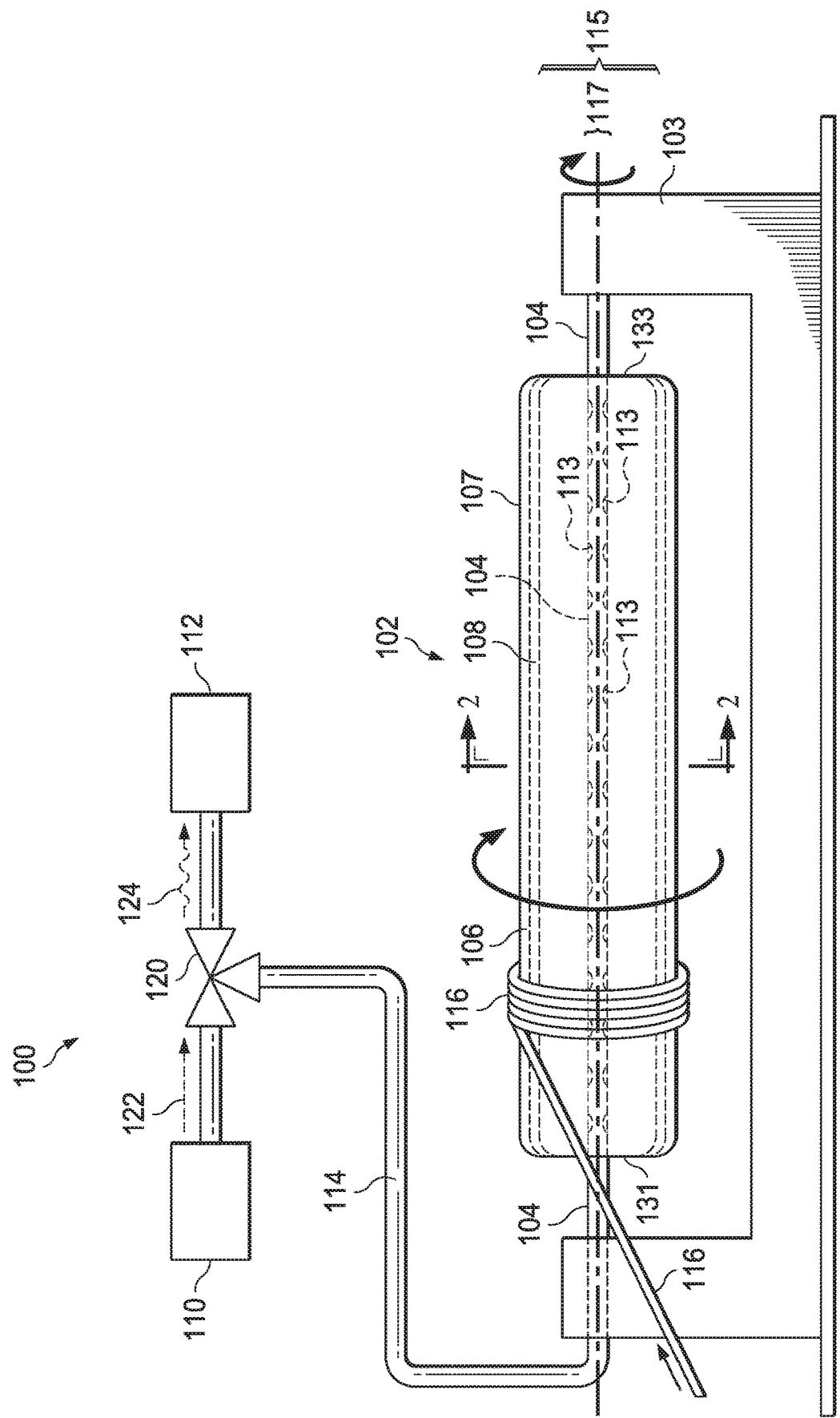
FIG. 1 is a front schematic view of a filament winding assembly.

FIG. 1 shows a filament winding assembly 100 that includes a rotating mandrel 102 (for example, a mold core), a rotatable shaft 104, a filament winding rig 103, and at least one fluid source 112 fluidically coupled to the mandrel 102. The mandrel 102 is axially coupled to the shaft 104 that rotates the mandrel 102 about a longitudinal axis 'L'. The shaft 104 is rotationally coupled to the filament winding rig 103. The rotating mandrel 102 includes a first perforated sleeve 106 with an exterior, winding surface 107 (for example, the winding surface of the mandrel). A continuous filament 116 is wound, under tension, on the winding surface 107 of the first perforated sleeve 106. The filament 116 can be, for example, carbon fibers, glass fibers, or aramid fibers, such as the Kevlar® fibers provided by DuPont™, located in Midland, Mich., USA. The filament 116 is impregnated on a matrix material (for example, an epoxy resin) before winding the filament 116 on the mandrel 102. After the filament 116 is wound on the mandrel 102 to a desired thickness, the wound filament 116 is further processed (for example, removed from the mandrel for additional processing steps) to form the final product.

The mandrel 102 also includes a second perforated sleeve 108 disposed inside the first perforated sleeve 106. The second perforated sleeve 108 is attached to the rotating shaft 104 to rotate with the rotating shaft 104. The second perforated sleeve 108 defines an interior volume 115 fluidically coupled, through a fluid conduit 114, to the fluid source 112. The fluid conduit 114 extends away from the mandrel 102 and can deliver fluid into the interior volume 115 or receive fluid from the interior volume 115.

The fluid source 112 can be or include a vacuum source (for example, a vacuum pump) and a steam source (for example, a steam pump). In some implementations, as shown in FIG. 1, the fluid source 112 can only be a vacuum source and a second fluid source 110 fluidically coupled to the interior volume 115 can include the steam source. For example, the first fluid source 112 can be fluidically coupled, through a three-way valve 120, to the second fluid source 110. The first fluid source 112 and second fluid source 110 can be fluidically coupled, through the common fluid conduit 114, to the interior volume 115 of the second perforated sleeve 108. As further described in detail later with respect to FIGS. 3-5, the first fluid source 112 can vacuum or exhaust air 124 from the winding surface 107 (for example, from the wound filament 116) and the second fluid source 110 can inject steam 122 into mandrel 102 to at least partially cure the wound filament 116. Vacuuming air from the filament 116 as the filament 116 is being wound (for example, during the manufacturing process) can help reduce voids and other manufacturing defects of the final product. One cause for void formation is the release of air or gases from the epoxy resin during curing. The air can be trapped in the resin during the winding process and if the air is not released prior to curing, the formed voids can compromise the structural integrity of the final product. Additionally, injecting steam into the same mandrel 102 (for example, after winding) can help uniformly cure the wound filament 116 to reduce manufacturing defects of the final product.

The mandrel 102 includes a first closed end 131 opposite a second closed end 133 to prevent fluid (for example, steam) from leaving the interior volume 115 through the ends 131 and 133 of the mandrel 102. At least a portion of the rotating shaft 104 can be hollow to receive a portion of the fluid conduit 114. The fluid conduit 114 can extend from an aperture of the rig 103, through the hollow shaft 104, and into the mandrel 102. The portion of the shaft 104 inside the mandrel 102 can be hollow and include holes or apertures 113 that fluidically couple the interior of the shaft 104 to the interior volume 115 of the mandrel 102. For example, the shaft 104 defines a second interior volume 117 fluidically coupled, through the shaft apertures 113, to the interior volume 115. Thus, fluid can flow from the interior volume 115 to the fluid conduit 114 through the interior volume 117 of the rotating shaft 104, and from the fluid conduit 114 to the interior volume 115 of the mandrel 102 through the interior volume 117 of the shaft 104.

Figure 2:
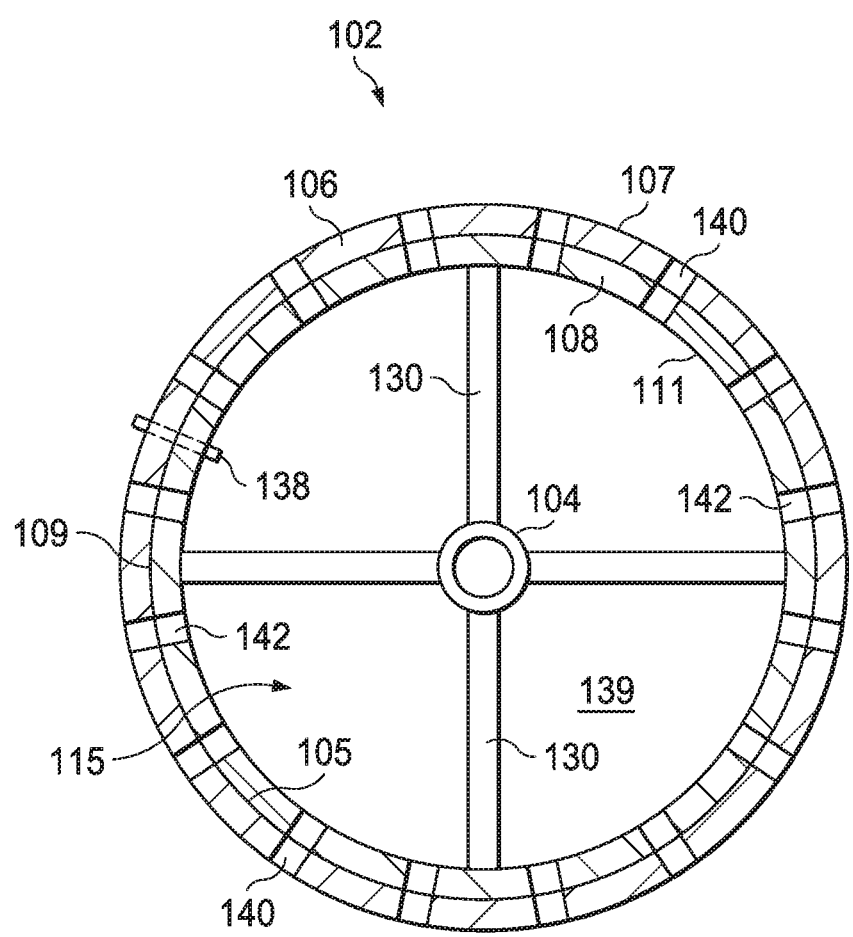
FIG. 2 is a schematic cross-sectional view of a mandrel of the filament winding assembly of FIG. 1, taken along line 2-2 in FIG. 1.

FIG. 2 shows a cross-sectional view of the mandrel 102 taken along line 2-2 in FIG. 1. The first and second perforated sleeves 106 and 108 of the mandrel 102 can be concentric tubes that rotate together when winding the filament. The second perforated sleeve 108 of the mandrel 102 is tightly snug inside the first perforated sleeve 106 to help prevent fluid from flowing (for example, flowing laterally) between an outer surface 109 of the second perforated sleeve 108 and an inner surface 105 of the first perforated sleeve 106. For example, the radius or diameter of the perforated sleeves 106 and 108 can have tight tolerances (for example, 0.0001 to 0.1 mm) to help prevent fluid from flowing laterally between the two sleeves. As further described in detail later with respect to FIGS. 3-5, respective holes 140 and 142 of the rotating sleeves align with each other to form fluid pathways.

The second perforated sleeve 108 has a cap 139 at each end 131 and 133 of the perforated sleeve 108 to help prevent steam from leaving the interior volume 115 and to help prevent air from entering the interior volume 115 from the sides of the mandrel 102. The first perforated sleeve 106 can also have a cap at each end of the mandrel 102 to help prevent steam from leaving mandrel 102 and to help prevent air from entering the interior volume 115 from the sides of the mandrel 102. To prevent the sleeves 106 and 108 from rotating with respect to each other during winding, both sleeves 106 and 108 can be connected by a lock 138 fixed to the caps of each perforated sleeve 106 and 108. The lock 138 can be manually or automatically actuated to lock and unlock the sleeves 106 and 108 to prevent and allow the sleeves from rotating with respect to each other. For example, during winding, both sleeves 106 and 108 are rotationally locked with respect to each other to rotate together with the shaft 104, and before injecting steam into the interior volume 115, the lock can disengage the sleeves 106 and 108 to rotate the sleeves and close the interior volume 115. The rotating shaft 104 is a concentric shaft attached, through wings 130 or rods, to an inside surface 111 of the second perforated sleeve 106 to rotate the mandrel 102.

Figure 3:
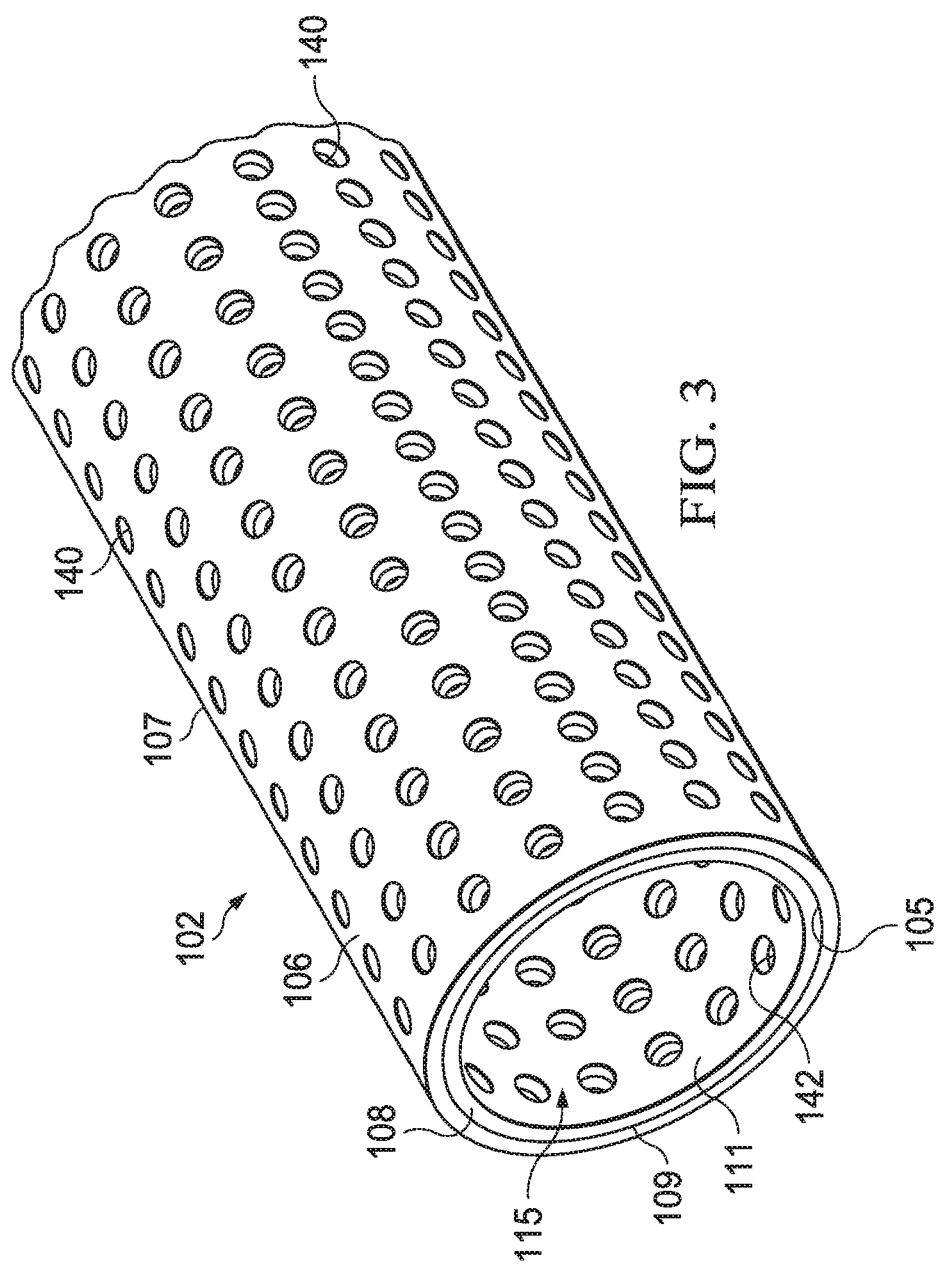
FIG. 3 is a perspective schematic view of a portion of a mandrel.

FIG. 3 shows a portion of the rotating mandrel 102. The first perforated sleeve 106 of the mandrel 102 defines multiple perforations or holes 140 along the length (for example, on the curved surface) of the perforated sleeve 106. The holes 140 extend from the winding surface 107 of the sleeve 106 to the inner surface 105 of the sleeve 106. The holes of the first perforated sleeve 106 (and the second perforated sleeve 108) can have a diameter, for example, of between $3.37 \times 10^{-5}$ to 0.338 millimeters. Each perforated sleeve can have, for example, between 10 to 500 holes per square meter. Similar to the first perforated sleeve 106, the second perforated sleeve 108 has holes 142 that extend from the outer surface 109 of the sleeve 108 to the inside surface 111 of the sleeve 108.

Figure 4:
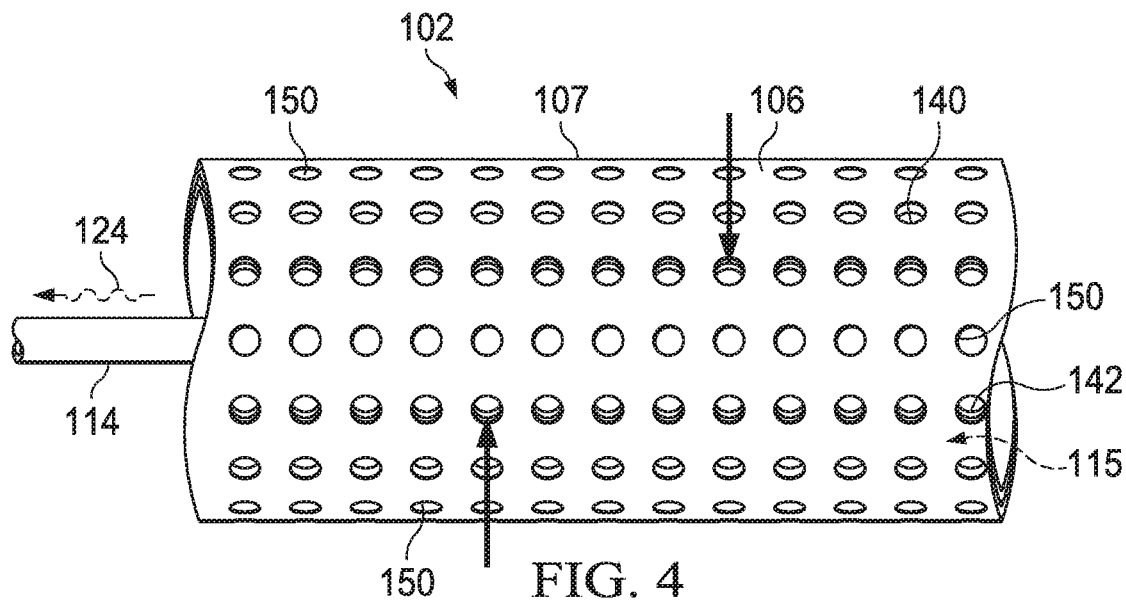
FIG. 4 is a perspective front view of the portion of the mandrel of FIG. 3, with an interior volume of the mandrel open.

Referring also to FIG. 4, the holes 142 of the second perforated sleeve 108 correspond with the holes 140 of the first perforated sleeve 106 to form fluid pathways 150 that open the interior volume 115 to the exterior surface of the mandrel 102. For example, the holes 142 of the second perforated sleeve 108 form respective fluid pathways 150 with the holes 140 of the first perforated sleeve 106 when the holes 142 of the second perforated sleeve 108 are aligned with the holes 140 of the first perforated sleeve 106. The fluid pathways 150 extend from the interior volume 115 of the second perforated sleeve 108 to the winding surface 107 of the first perforated sleeve 106.

Figure 5:
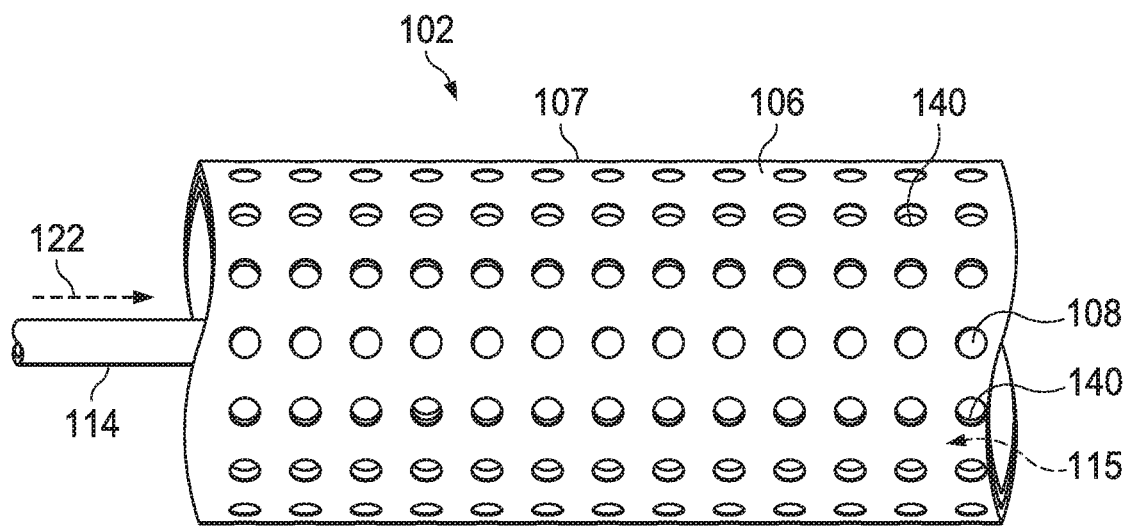
FIG. 5 is a perspective front view of the portion of the mandrel of FIG. 3, with the interior volume of the mandrel closed.

As shown in FIGS. 4 and 5, the second perforated sleeve 108 rotates with respect to the first perforated sleeve 106 to align or misalign the holes 142 of the second perforated sleeve 108 with the holes 140 of the first perforated sleeve 106 to open or close the fluid pathways 150. For example, each hole 142 of the second perforated sleeve 108 is arranged to align with each hole 140 of the first perforated sleeve 106 to form respective fluid pathways 150. The interior volume 115 is open when the holes 142 of the second perforated sleeve 108 are aligned with the holes 140 of the first perforated sleeve 106 and the interior volume 115 is at least partially closed when the holes 142 of the second perforated sleeve 108 are misaligned or offset with respect to the holes 140 of the first perforated sleeve 106. To rotate the second perforated sleeve 108 with respect to first perforated sleeve 106, the first perforated sleeve 106 can be rotationally locked while a hydraulic system (not shown) rotates the second perforated sleeve 108.

As shown in FIG. 4, the fluid source 112 (see FIG. 1) vacuums, through the interior volume (and with the interior volume open), air from the wound filament to reduce voids in the wound filament. As shown in FIG. 5, the fluid source 112 or a different fluid source 110 fluidically coupled to the interior volume 115 flows, with the interior volume 115 at least partially closed, steam 122 into the interior volume 115 to heat the rotating mandrel 102 to help uniformly cure at least part of the wound filament.

Figure 6:
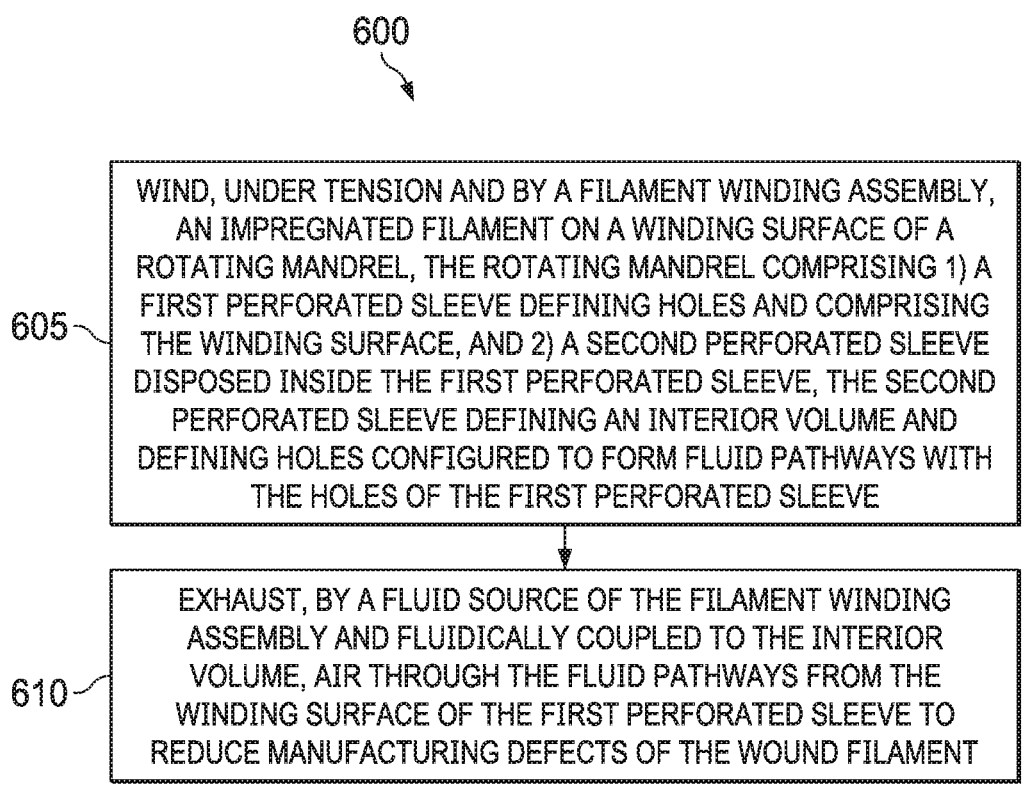
FIG. 6 is a flow chart of an example method of manufacturing composite parts.

FIG. 6 shows a flowchart of an example method 600 that includes winding, under tension and by a filament winding assembly, an impregnated filament on a winding surface of a rotating mandrel, the rotating mandrel including 1) a first perforated sleeve defining holes and including the winding surface, and 2) a second perforated sleeve disposed inside the first perforated sleeve, the second perforated sleeve defining an interior volume and defining holes configured to form fluid pathways with the holes of the first perforated sleeve (605). The method also includes exhausting, by a fluid source of the filament winding assembly and fluidically coupled to the interior volume, air through the fluid pathways from the wound filament to reduce manufacturing defects of the wound filament (610).

Although the following detailed description contains many specific details for purposes of illustration, it is understood that one of ordinary skill in the art will appreciate that many examples, variations and alterations to the following details are within the scope and spirit of the disclosure. Accordingly, the exemplary implementations described in the present disclosure and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A filament winding assembly comprising:
  a rotating mandrel coupled to a shaft configured to rotate the rotating mandrel, the rotating mandrel comprising:
    a first perforated sleeve defining holes and comprising a winding surface, and
    a second perforated sleeve disposed inside the first perforated sleeve, the second perforated sleeve attached to the shaft and defining an interior volume, the second perforated sleeve defining holes configured to form fluid pathways with the holes of the first perforated sleeve, the fluid pathways extending from the interior volume to the winding surface of the first perforated sleeve, the second perforated sleeve configured to rotate with respect to the first perforated sleeve to open and close the fluid pathways;
  a filament configured to be wound, under tension, around the winding surface of the first perforated sleeve; and
  a fluid source fluidically coupled to the interior volume of the second perforated sleeve, the fluid source configured to exhaust, through the fluid pathways, fluid from the wound filament.

2. The filament winding assembly of claim 1, wherein the second perforated sleeve is configured to rotate to align or misalign the holes of the second perforated sleeve with the holes of the first perforated sleeve to open or close the fluid pathways, the interior volume open when the holes of the second perforated sleeve are aligned with the holes of the first perforated sleeve and the interior volume at least partially closed when the holes of the second perforated sleeve are misaligned with respect to the holes of the first perforated sleeve.

3. The filament winding assembly of claim 1, wherein the second perforated sleeve comprises a first closed end opposite a second closed end, wherein at least one of the first closed end or the second closed end is attached to the shaft to rotate the rotating mandrel.

4. The filament winding assembly of claim 1, wherein the first perforated sleeve is a first perforated tube and the second perforated sleeve is a second perforated tube, the second perforated tube axially coupled to the shaft, the second perforated tube and the first perforated tube configured to rotate together with the shaft during winding of the filament.

5. The filament winding assembly of claim 1, wherein the fluid source is configured to vacuum, with the interior volume open, air from the wound filament during a manufacturing process when the filament is being wound on the mandrel.

6. The filament winding assembly of claim 1, wherein the shaft is a hollow shaft comprising apertures, the hollow shaft defining a second interior volume fluidically coupled, through the shaft apertures, to the interior volume of the second perforated sleeve and wherein the fluid source is fluidically coupled, through a fluid conduit extending through the second interior volume of the hollow shaft, to the interior volume of the second perforated sleeve.

7. The filament winding assembly of claim 2, wherein the fluid source is configured to vacuum, with the interior volume open, air from the wound filament to reduce voids in the wound filament.

8. The filament winding assembly of claim 2, wherein the fluid source or a different fluid source fluidically coupled to the interior volume is configured to flow, with the interior volume at least partially closed, steam into the interior volume to heat the rotating mandrel to help uniformly cure at least part of the wound filament.

9. The filament winding assembly of claim 2, wherein each hole of the second perforated sleeve is configured to align with each hole of the first perforated sleeve to form respective fluid pathways.

10. The filament winding assembly of claim 2, wherein the second perforated sleeve is tightly snug inside the first perforated sleeve to help prevent fluid from flowing between an outer surface of the second perforated sleeve and an inner surface of the first perforated sleeve.

11. The filament winding assembly of claim 2, wherein the mandrel comprises a lock attached to the first perforated sleeve and the second perorated sleeve, the lock actuable to prevent rotation of the second perforated sleeved with respect to the first perforated sleeve and actuable to allow rotation of the second perforated sleeved with respect to the first perforated sleeve.

12. A filament winding mandrel comprising:
  a first perforated sleeve defining holes and comprising a winding surface; and
  a second perforated sleeve disposed inside the first perforated sleeve, the second perforated sleeve attached to a rotating shaft configured to rotate the filament winding mandrel, the second perforated sleeve defining an interior volume and defining holes configured to form fluid pathways with the holes of the first perforated sleeve, the fluid pathways extending from the interior volume to the winding surface of the first perforated sleeve, the second perforated sleeve configured to rotate with respect to the first perforated sleeve to open and close the fluid pathways, the second perforated sleeve configured to be fluidically coupled to a fluid source configured to exhaust, through the fluid pathways, fluid from a filament wound on the winding surface of the first perforated sleeve.

13. The filament winding mandrel of claim 12, wherein the second perforated sleeve is configured to rotate to align or misalign the holes of the second perforated sleeve with the holes of the first perforated sleeve to open or close the fluid pathways, the interior volume open when the holes of the second perforated sleeve are aligned with the holes of the first perforated sleeve and the interior volume at least partially closed when the holes of the second perforated sleeve are misaligned with respect to the holes of the second perforated sleeve.

14. The filament winding mandrel of claim 13, wherein each hole of the second perforated sleeve is configured to align with each hole of the first perforated sleeve to form respective fluid pathways.

15. The filament winding mandrel of claim 13, wherein the second perforated sleeve is tightly snug inside the first perforated sleeve to help prevent fluid from flowing between an outer surface of the second perforated sleeve and an inner surface of the first perforated sleeve.

16. The filament winding mandrel of claim 12, wherein the first perforated sleeve is a first perforated tube and the second perforated sleeve is a second perforated tube, the second perforated tube axially coupled to the shaft, the second perforated tube and the first perforated tube configured to rotate together with the shaft during winding of the filament.

* * * * *